(12) United States Patent
Nelte et al.

(10) Patent No.: US 6,389,043 B1
(45) Date of Patent: May 14, 2002

(54) EFFICIENT FREQUENCY-CONVERTED LASER WITH SINGLE BEAM OUTPUT

(75) Inventors: Sven E. Nelte, Carlsbad; David E. Hargis, San Diego, both of CA (US)

(73) Assignee: Melles Griot, Inc., Carlsbad, CA (US)

( * ) Notice: Subject to any disclaimer, the term of this patent is extended or adjusted under 35 U.S.C. 154(b) by 0 days.

(21) Appl. No.: 09/520,695

(22) Filed: Mar. 7, 2000

Related U.S. Application Data

(63) Continuation-in-part of application No. 09/130,378, filed on Aug. 6, 1998, now Pat. No. 6,101,201, which is a continuation of application No. 08/784,051, filed on Jan. 17, 1997, now Pat. No. 5,796,766.

(51) Int. Cl.[7] ............................................... H01S 3/10
(52) U.S. Cl. .............................. 372/22; 372/92; 372/98
(58) Field of Search .............................. 372/22, 92, 98

(56) References Cited

U.S. PATENT DOCUMENTS

| | | |
|---|---|---|
| 4,731,787 A | 3/1988 | Fan et al. |
| 4,739,507 A | 4/1988 | Byer et al. |
| 4,809,291 A | 2/1989 | Byer et al. |
| 4,847,851 A | 7/1989 | Dixon |
| 4,872,177 A | 10/1989 | Baer et al. |
| 4,933,947 A | 6/1990 | Anthon et al. |
| 5,063,566 A | 11/1991 | Dixon |
| 5,070,505 A | 12/1991 | Dixon |
| 5,164,947 A | 11/1992 | Lukas et al. |
| 5,511,085 A | 4/1996 | Marshall |
| 5,761,227 A * | 6/1998 | Hargis et al. ................. 372/22 |
| 5,905,748 A * | 5/1999 | Xie .............................. 372/22 |
| 6,108,355 A * | 8/2000 | Zorabedian .................. 372/20 |

FOREIGN PATENT DOCUMENTS

| | | | |
|---|---|---|---|
| DE | 4141052 A | 6/1993 | |
| EP | 0336665 A2 | 10/1989 | |
| EP | 0455383 A2 | 11/1991 | ........... H01S/3/109 |

(List continued on next page.)

OTHER PUBLICATIONS

Fan T., et al., "Nd:MgO:LiNbO$_3$ Spectroscopy and Laser Devices", *J. Opt. Soc. Am.* vol. 3, No. 1: pp. 140–147 (1986).

Lin, J.T., "Progress Report: Diode Pumping and Frequency Conversion", *Lasers & Optronics* pp 61–66 (Jul. 1989).

Lin, J.T., "Doubled Jeopardy :The Blue–Green Race's New Players," *Lasers & Optronics* pp. 34–40 (Dec. 1990).

(List continued on next page.)

*Primary Examiner*—Leon Scott, Jr.
(74) *Attorney, Agent, or Firm*—Law Offices of James D. McFarland

(57) ABSTRACT

An efficient frequency-converted solid state laser that outputs a single beam utilizing an angled reflector situated within the laser cavity. The laser comprises an optical cavity including a first reflector and a second reflector. A gain medium situated within the optical cavity is energized by a pump source to excite a laser emission at a fundamental wavelength. A nonlinear material is arranged within the optical cavity to convert the laser emission to a second wavelength. The angled reflector, which is reflective of the second wavelength and transmissive of the first wavelength, is situated within the optical cavity between the first reflector and the nonlinear material. In operation, the forward-propagating converted beam is reflected from the second reflector, and then combines with the reverse-propagating converted beam. The angled reflector reflects the combined beam so that it exits from the optical cavity at a nonzero exit angle. Typically, the angled reflector and the exit angle are selected so that the angled reflector reflects substantially all polarizations of the combined beam. In some embodiments, the angled reflector is formed on the nonlinear material. In other embodiments, the gain medium is coupled to a surface that comprises the angled reflector, such as an optically transparent heatsink. Some embodiments include means for reflecting the first converted beam from the second reflector so that the reflected first converted beam is approximately in phase with the second converted beam within the nonlinear material.

42 Claims, 3 Drawing Sheets

FOREIGN PATENT DOCUMENTS

| | | | |
|---|---|---|---|
| JP | 3-102886 | 4/1991 | ........... H01S/3/081 |
| JP | 04082281 | 3/1992 | ........... H01S/3/042 |
| JP | 05267753 | 10/1993 | ........... H01S/3/042 |
| JP | 09298333 | 11/1997 | ............ H01S/3/11 |
| WO | WO 98/25327 | * 6/1998 | |
| WO | WO98/25327 | 6/1998 | ........... H01S/3/109 |
| WO | WO08727 A | 2/2000 | |

OTHER PUBLICATIONS

Nabors, C., et al., "High–Power, Continuous Wave. Nd:YAG Microchip Laser Array", *Optics Letters*, vol. 17, No. 22, pp. 1587–1589 (1992).

Sasaki et al., "Single–Longitudinal Mode . . . Microchip Lasers," *Optics Letters*, vol. 16, No. 21, pp. 1665–1627.

* cited by examiner

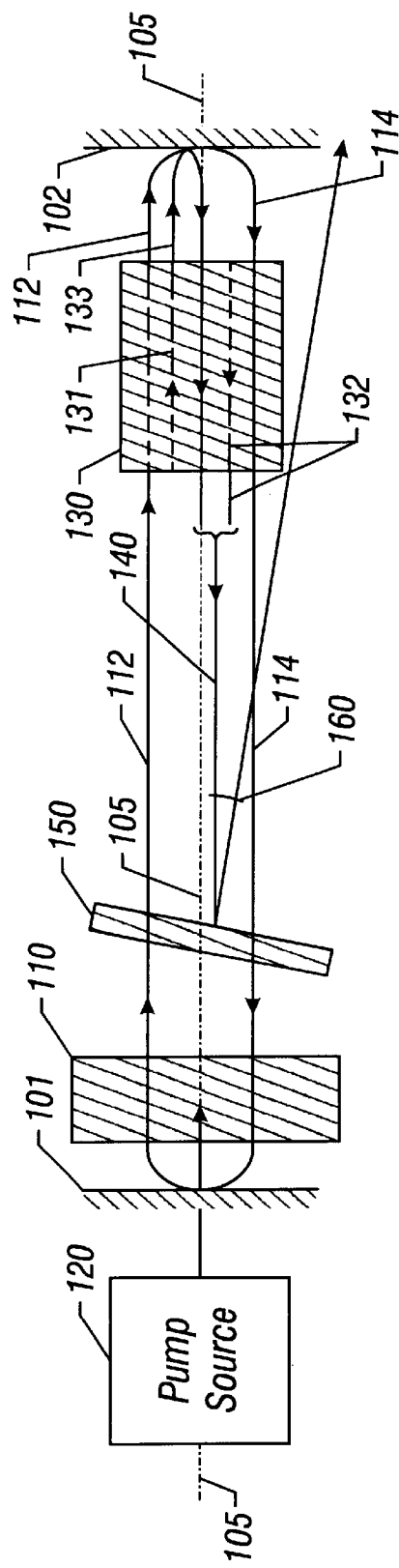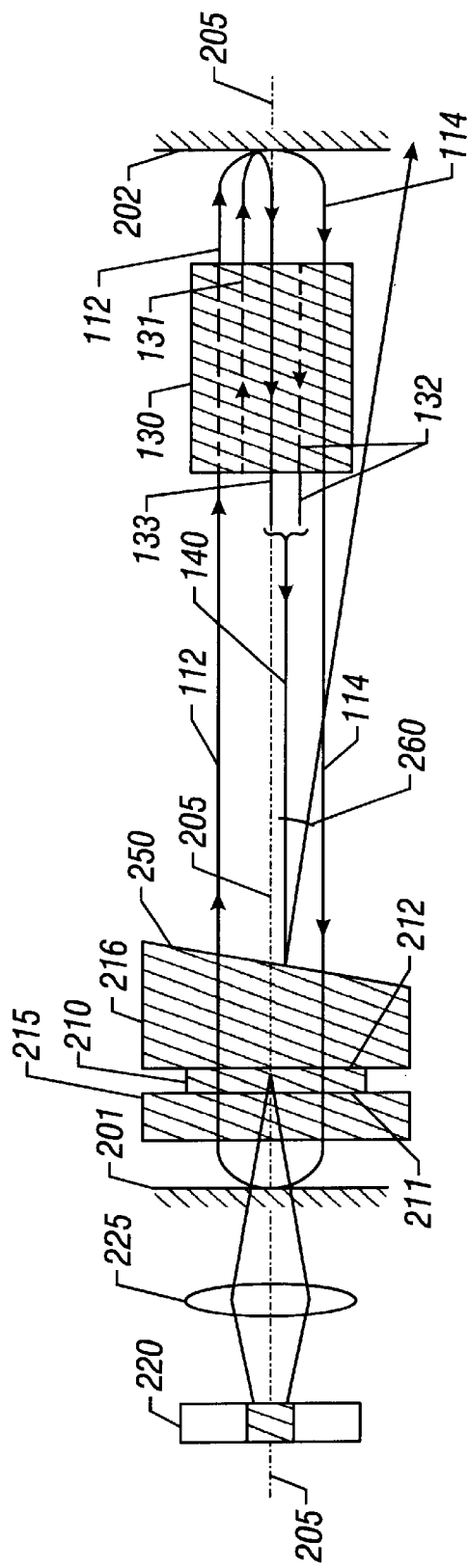

EFFICIENT FREQUENCY-CONVERTED LASER WITH SINGLE BEAM OUTPUT

This is a continuation-in-part of U.S. patent application Ser. No. 09/130,378 filed on Aug. 6, 1998, now U.S. Pat. No. 6,101,201, which issued Aug. 8, 2000, which is a continuation of application Ser. No. 08/784,051, filed Jan. 17, 1997, now U.S. Pat. No. 5,796,766 which issued Aug. 18, 1998.

BACKGROUND OF THE INVENTION

1. Field of the Invention

The present invention generally relates to lasers, and particularly to lasers in which a fundamental laser emission at a first (fundamental) frequency is converted to a second (converted) frequency.

2. Description of Related Art

A typical laser comprises an optical cavity, a gain medium situated within the cavity, and a pump source that pumps the gain medium to a level at least sufficient to support lasing operation and generate a laser emission at a fundamental wavelength. In a frequency-converted laser, the fundamental laser emission propagates through a nonlinear material arranged to frequency-convert the fundamental wavelength to a second wavelength. Often, the frequency-conversion is a doubling process in which the frequency is doubled (i.e. the wavelength is halved); however other processes such as frequency-tripling or sum-frequency processes are used in some lasers.

Frequency conversion in lasers is an important process because it allows access to laser wavelengths that would otherwise be inaccessible or difficult to generate. For example, many commercial laser products frequency-double the infrared 1064 nm line in a Nd-doped solid state material such as Nd:YAG or Nd:YVO$_4$ thereby generating a green beam at 532 nm. However, it can be difficult to efficiently convert the frequency and/or obtain high power in a frequency-converted laser.

Desirable objectives of a commercial laser product are high efficiency, stable output, high beam quality, long operating lifetime, and reasonable cost. Unfortunately, many tradeoffs are made to obtain stable operation at high power and at a reasonable cost. For example, high conversion efficiency is obtained when the nonlinear material is situated within the optical cavity where the fundamental emission has a higher intensity than outside the optical cavity. However, this intra-cavity arrangement creates a host of other problems such as instability caused by the frequency-converted radiation disrupting the laser emission process within the optical cavity.

In order to make a frequency-converted laser more stable and prevent propagation of the frequency-converted beam through the gain medium, it has been suggested to utilize a folded-cavity configuration in which a folding mirror, which is highly reflective of the fundamental laser emission, is situated between the gain medium and the nonlinear material. The folding mirror is highly transmissive of the second wavelength, while the end mirror is highly reflective of the second wavelength, and therefore the frequency-converted beam exits through the folding mirror before propagating through the gain medium. However, the folded cavity configuration is difficult to align, it has proven difficult and costly to make in commercial quantities.

Japanese Patent Application Disclosure No. Hei 1-239892, by Gotoh, entitled "Solid State Laser Device" discloses a linear cavity that includes a mirror mounted to form Brewster's angle to the axis of resonance, enabling the fundamental (basic) emission at a specific linear polarization to pass through the Brewster's angle mirror, while providing a high reflection at Brewster's angle for orthogonally-polarized light at the second harmonic wavelength. The Brewster's angle mirror is mounted between a nonlinear crystal and a laser medium, and includes coatings that enhance transmission of the polarized fundamental emission at Brewster's angle. Additionally, the coating must increase the reflection of orthogonally-polarized second harmonic wavelength at Brewster's angle. Unfortunately, the Brewster's angle mirror requires linear, orthogonal polarizations of both the fundamental emission and the second harmonic beam, which can lead to reduced efficiency. Furthermore, this polarization requirement dictates that the laser must be precisely aligned for both the fundamental emission and the second harmonic beam, which is difficult and costly, because even a minor polarization misalignment can significantly reduce power and efficiency. Misalignment can occur for a number of reasons, such as stress- or temperature-induced birefringence in the nonlinear crystal or gain medium. If the main polarization of the fundamental emission is misaligned, then the angled mirror will reflect some of the fundamental emission out of the cavity, preventing laser operation. If the main polarization of the second harmonic beam is misaligned, then some of the second harmonic beam is not reflected out from the cavity. In either instance the frequency-converted laser suffers reduced efficiency, and thus the laser configuration with the Brewster's angle mirror is not desirable, especially given the expected lifetime of a commercial product.

Marshall, in U.S. Pat. No. 5,511,085, entitled "Passively Stabilized Intracavity Doubling Laser" discloses several embodiments of an intracavity-doubled laser, including an intracavity frequency-doubled laser in a linear configuration. In some embodiments described by Marshall, a linear cavity laser includes an intracavity dichroic mirror placed between the laser crystal and the nonlinear frequency-doubling crystal, the intracavity mirror being highly reflective at the doubled frequency but transmissive at the fundamental. The intracavity mirror reflects the backward-propagating frequency-doubled light directly back through the nonlinear crystal at 180° so that both the forward frequency-doubled beam and the backward frequency-doubled beam exit the cavity through the end mirror, overlapped as a single beam propagating in the same direction. Unfortunately, reflecting the converted beam directly back along the beam path, collinear with the forward-propagating converted beam, has been found to adversely affect the efficiency and stability of the frequency conversion process, creating undesirable output power fluctuations and low average power.

SUMMARY OF THE INVENTION

In order to overcome the limitations of prior art solid state lasers, the present invention provides an efficient frequency-converted solid state laser that outputs a single beam utilizing an angled reflector situated within the laser cavity.

The frequency-converted laser comprises an optical cavity including a first reflector and a second reflector that define an optical axis. The first and second reflectors are reflective at the first wavelength, the second reflector also being reflective at the second wavelength. A gain medium is situated within the optical cavity and a pump source is arranged to pump the gain medium to excite the laser emission within the optical cavity. A nonlinear material is situated between the gain medium and the second reflector, the nonlinear material being arranged within the optical cavity to convert fundamental wavelength of the laser emission to a second wavelength. An angled reflector that is reflective of the second wavelength and transmissive of the first wavelength is situated within the optical cavity between the first reflector and the nonlinear material, arranged to reflect optical radiation at the converted wavelength at a nonzero exit angle with respect to the optical axis.

In operation, the fundamental laser emission generated in the gain medium at a first wavelength is frequency-converted to second wavelength in the nonlinear crystal. Particularly, the fundamental laser emission includes a forward-propagating emission propagating in a first direction and a reverse-propagating emission propagating in a second, opposite direction. The forward-propagating emission is frequency-converted to generate a first converted beam propagating in the first direction, which is then reflected from the second reflector. The reverse-propagating emission is frequency-converted in the nonlinear material to generate a second converted beam that co-propagates in the second direction together with said reflected first converted beam to provide a combined frequency-converted beam. The combined beam is reflected at a predefined nonzero angle with respect to the optical axis to provide a reflected converted beam. Typically, the angled reflector and the exit angle are selected so that the angled reflector reflects substantially all polarizations of the combined beam, and the exit angle is a non-Brewster's angle.

In some embodiments, the nonlinear material comprises a first end proximate to the gain medium and a second end proximate to the second reflector, and the angled reflector is formed on the first end. In some such embodiments, the second end comprises a first section that intersects the laser axis, the first section being substantially reflective at the second wavelength and a second section arranged with respect to the angled reflector so that the reflected combined converted beam is output therethrough, the second section being substantially transmissive at the second wavelength.

In other embodiments, the gain medium is coupled to a surface that comprises the angled reflector. In some such embodiments, the laser further comprises an optically transparent heatsink coupled to the gain medium, the heatsink including the surface that comprises the angled reflector. Some embodiments include means for reflecting the first converted beam from the second reflector so that the reflected first converted beam is approximately in phase with the second converted beam within the nonlinear material.

BRIEF DESCRIPTION OF THE DRAWINGS

For a more complete understanding of this invention, reference is now made to the following detailed description of the embodiments as illustrated in the accompanying drawing, wherein:

FIG. 1 is a cross-sectional view of a frequency-converted laser including a wavelength-dependent angled reflector for reflecting a combined, converted beam from the laser cavity;

FIG. 2 is a cross-sectional view of one embodiment of a frequency-converted laser including optically transparent heatsinks, and an angled reflector formed on one of the heatsinks;

DETAILED DESCRIPTION

Figure 3:
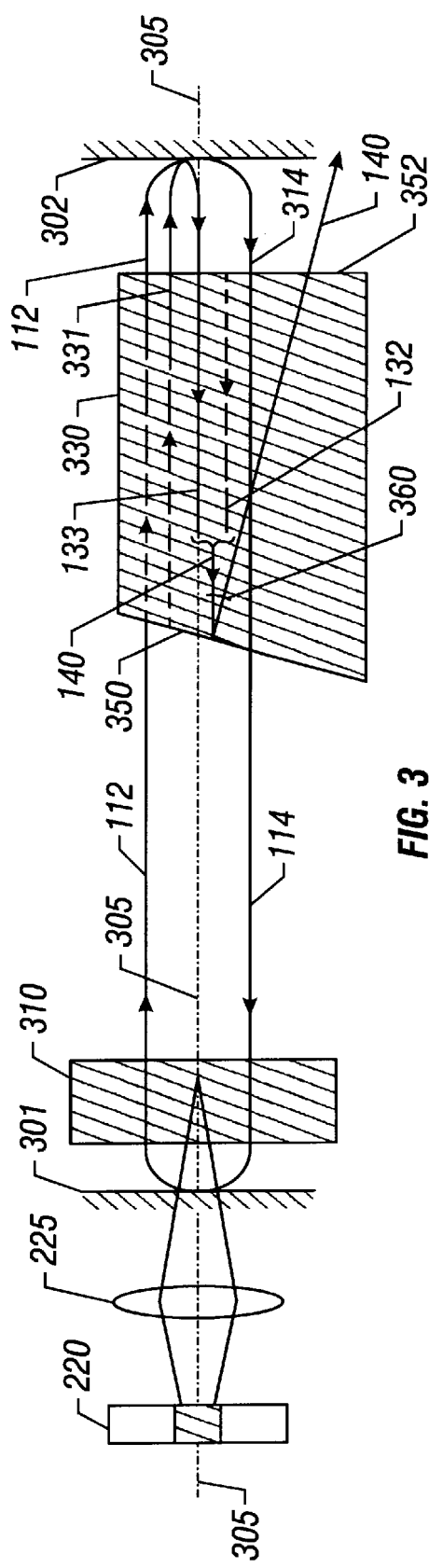
FIG. 3 is a cross-sectional view of another embodiment of a frequency converted laser in which the angled reflector is formed on the nonlinear material.

This invention is described in the following description with reference to the Figures, in which like numbers represent the same or similar elements.

Herein, the terms "wavelength" ($\lambda$) and "frequency" (f) are used interchangeably to characterize one parameter of laser radiation. Wavelength is defined herein as the wavelength in free space, and therefore either term (i.e., either wavelength or frequency) uniquely characterizes the laser radiation due to the well-known relationship $\lambda f = c$, where c equals the speed of light in the medium (herein assumed to be free space).

Although frequency conversion processes can be broadly defined to include any type of conversion from one wavelength to another, considerable attention has been directed to harmonic conversion, and specifically second harmonic generation (hereinafter referred to as "SHG"). In a SHG process, a fundamental laser frequency is doubled so that the converted frequency is twice that of the fundamental. In terms of wavelength, frequency-doubling means that the converted wavelength is one-half of the fundamental wavelength. In some embodiments the frequency is doubled; e.g., a fundamental emission at 1064 nm is frequency-doubled to 532 nm (green). However, in alternative embodiments other frequency-conversion processes, such as frequency-tripling, may be used.

FIG. 1 is a diagram of an intracavity frequency-converted laser including an optical cavity defined between end mirrors including a first (back) reflector 101 and second (front) reflector 102 that define an optical axis 105. Both the first and second reflectors are highly reflective at a first (fundamental) wavelength $\lambda_i$. A gain medium 110 is situated within the optical cavity so that it receives pump energy from a pump source 120, and responsive thereto provides a fundamental laser emission at the first wavelength ($\lambda_i$) which causes lasing oscillation within the optical cavity. The lasing oscillation within the optical cavity is illustrated in FIG. 1 by a circulating pattern including a forward-propagating emission 112 that propagates in a first (forward) direction from the first reflector 101 to the second reflector 102, and a backward-propagating emission 114 that propagates in a second (backward) direction from the second reflector to the first reflector. For purposes of illustration in FIG. 1, separate lines including the forward-propagating emission 112 and the reverse-propagating emission 114 are used to show the lasing oscillation within the laser cavity, and separate lines are used to show the converted beams to be described; however it will be apparent to one skilled in the art that in practice these beams are overlapping (with the exception of the beam reflected from the angled reflector, as described elsewhere herein).

The gain medium 110 comprises any suitable lasant material. Examples of solid-state gain media include rare-earth doped materials including $Nd^{3+}$, $Er^{3+}$, $Yb^{3+}$, $Tm^{3+}$, or $Ho^{3+}$ doped materials or transition metal ion (e.g. $Cr^{3+}$, $Cr^{4+}$) doped materials. In alternative embodiments other gain media, such as gas are used.

The pump source 120 provides any form of pump energy suitable for the gain medium, such as optical radiation or eelectrical energy. For example, solid-state gain media may be pumped by optical radiation and the pumping direction may longitudinal (i.e. along the optical axis of lasing) or from the side. The pump source additionally may include a heat sink or other temperature regulation means to maintain proper laser operation.

A nonlinear material 130, such as a nonlinear crystal, is situated within the optical cavity arranged such that it converts the first (fundamental) wavelength of the lasing oscillation to a second (converted) wavelength $\lambda_c$. Examples of nonlinear optical crystals include $KTIOPO_4$ (KTP), lithium niobate ($LiNbO_3$), potassium niobate ($KNbO_3$), lithium triborate ($LiB_3O_5$) which is commonly known as LBO, and beta barium borate ($\beta$-$BaB_2O_4$) which is commonly known as $\beta$-BBO. In operation, as the forward-propagating emission 112 propagates through the nonlinear material, it generates a first converted beam 131 propagating in the forward direction. The first converted beam 131 then exits the non-linear material, reflects from the second mirror 102, reverses direction in the second (backward) direction to define a reverse-propagating converted beam 133, and then enters the non-linear material and propagates therethrough. At the same time, the forward-propagating emission 112 exits the non-linear material, reflects from the second mirror 102, and reverses direction to define the backward-propagating emission 114. As the backward-propagating emission 114 propagates through the nonlinear material, it generates a second converted beam 132 propagating in the backward direction, together with the reflected first converted beam. Thus the second converted beam 132 and the reflected first beam 133, now co-propagating in the backward direction, define a combined converted beam 140.

An angled wavelength-dependent reflector 150 is situated between the gain medium 110 and the nonlinear material 130 to reflect the combined beam 140 at a non-zero angle with respect to the optical axis. The angled reflector 150 includes a reflective optical coating that is highly reflective at the second wavelength $\lambda_c$ in order to substantially reflect the backward converted beam 130 while also having an anti-reflection coating so that it is highly transmissive at the first wavelength $\lambda_i$ in order to allow lasing oscillation of the fundamental laser emission with minimal loss. The angled reflector 150 defines an angle $\alpha$ with respect to the optical axis 105 and therefore the combined beam 140, which is initially propagating along the optical axis, is reflected off the optical axis (i.e. at a non-zero axis to the optical axis) at an exit angle 160 equal to about $2\alpha$.

Generally, the exit angle 160 is chosen within a range that is small enough to substantially avoid polarization selective losses (i.e., at a non-Brewster's angle), and yet large enough to allow passage of the beam and avoid coupled cavity effects. For example, the exit angle may be within the range of about 0.5° to about 30°, with the smallest angle substantially eliminating polarization selective losses. Particularly, the exit angle should be large enough that the combined beam (or any significant portion) is not reflected back into the optical cavity, thereby avoiding coupled cavity effects. Furthermore, in some embodiments, the exit angle should be large enough to avoid the second reflector 102, which is reflective at the second wavelength. To avoid coupled cavity effects, the exit angle should be larger than one divergence angle of the beam reflected from the angled reflector; however it may be advisable to increase the exit angle to at least about two to three laser beam divergence angles in order to avoid any possibility of coupled cavity effects. The divergence angle, which is a measure of how quickly the beam diverges, varies between embodiments dependent upon implementation details.

To obtain maximum power, it is advantageous that the exit angle 160 be as small as reasonably possible within the constraints imposed by the second reflector 102 and the other elements of the laser system and associated structure. If the exit angle is small enough to substantially avoid polarization selectivity in the reflective coating of the angled reflector 150, then advantageously the combined output is substantially "polarization independent" and will have higher power than a highly polarization dependent output. In other words, if the exit angle is small, the combined output beam has a higher power that includes substantially all polarizations of the combined beam. Generally optical coatings are designed in such a way that the larger the exit angle, the greater the polarization selectivity and the larger the losses to the non-selected polarization. Therefore for some embodiments it may be desirable that the exit angle be less than about 10°; in other words, if the exit angle within the range of about 0.5° to about 10° then a suitable optical coating can be designed to be highly reflective at the converted wavelength while substantially avoiding polarization selection. Another suitable range for the exit angle is from about 4° to about 7°. In one embodiment the exit angle is about 5°.

Figure 4:
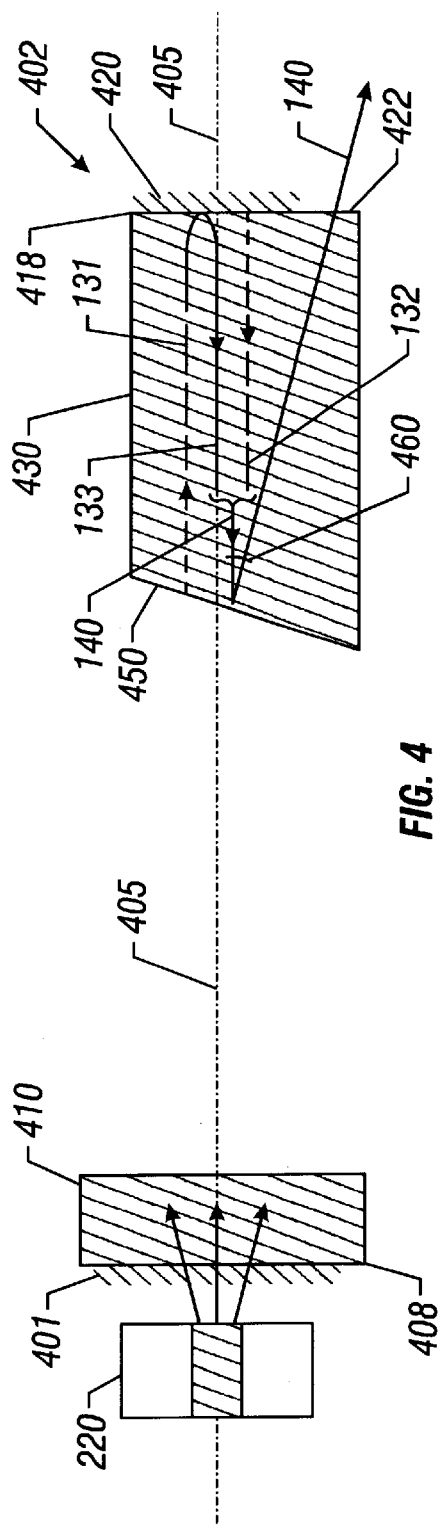
FIG. 4 is a cross-sectional view of another embodiment of a frequency converted laser in which the angled reflector is formed on the nonlinear material, and the exterior end of the nonlinear material has a section that is antireflection coated for outputting the combined beam reflected from the angled reflector.

The angled reflector 150 may comprise a separate optical component as shown in FIG. 1; however in an alternative embodiment as shown in FIGS. 3 and 4, the angled reflector is formed on the interior face of the nonlinear material, and in still other embodiments such as shown in FIG. 2, the angled reflector is formed on the interior surface of the gain medium.

Figure 5:
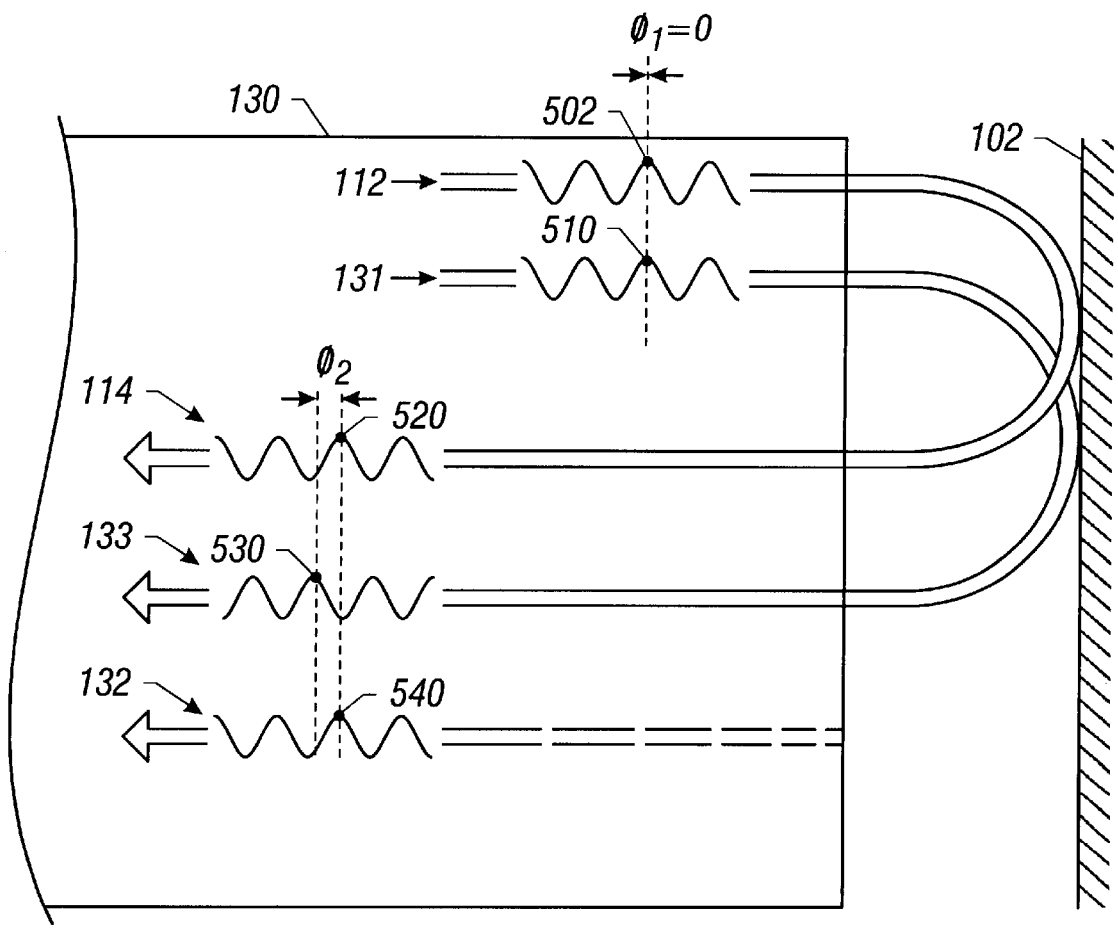
FIG. 5 is a diagram of a portion of the nonlinear material, illustrating the phase relationships between the fundamental emission and the converted beams.

Reference is now made to FIG. 5, which is a waveform diagram illustrating the relative phase of the fundamental emission and converted beams within the nonlinear crystal 130. The physics of the frequency conversion processes are such that the converted beams are generated in phase with the fundamental emission; i.e., the initial phase difference between the fundamental emission and converted beam is zero. For example, as shown in FIG. 5, the forward-propagating emission 112 has a peak 502 that is aligned with a peak 510 of the forward-propagating converted beam 131, which translates to a phase difference ($\phi_1$) of 0°. However, after the first converted beam and the forward-propagating emission exit the nonlinear crystal 130, a variety of factors may cause it to become dephased (out-of-phase) with the fundamental emission (the forward-and reverse-propagating emission). For example, dispersion in the material in the gap between the non-linear material and the second mirror 102 may cause the first converted beam to dephase from the fundamental emission. Dispersion is due to wavelength-dependent differences in the indexes of refraction. Furthermore, dephasing between the fundamental emission and converted beams may be caused by reflective phase differences (i.e. wavelength-dependent phase shifts) upon reflection from the second mirror. This phase difference ($\phi_2$) is shown in FIG. 5 by the relative difference between a peak 520 of the reverse-propagating fundamental emission 114 and a peak 530 of the reflected first converted beam.

The reverse-propagating emission 114 and the second converted beam 132 have an equal phase, as illustrated by alignment of a peak 540 in the second converted beam with the peak 520 of the reverse-propagating emission. Therefore, the second converted beam is also dephased from the reverse-propagating fundamental emission 114 by the phase difference ($\phi_2$). If the phase difference $\phi_2$ is significant, then the second converted beam and the reflected first converted beams can interfere with each other, significantly lowering overall power of the combined converted beam. In an extreme example, if the phase difference is 180°, then complete destructive interference will occur between the co-propagating (parallel and overlapping) converted beams, and power output will be zero.

In order to avoid significant interference between the two co-propagating converted beams, the coatings on the non-linear crystal, the second mirror 102, and/or the medium in the gap between the two is selected to equalize any dispersion that may have occurred. For some embodiments, the dispersion in the gap may be small, and in such embodiments it is sufficient that the reflective coating on the second mirror 102 does not substantially dephase the fundamental emission and the converted beams (i.e. there is no significant reflective phase difference between the converted and fundamental wavelengths). However, in embodiments in which dispersion is significant, then corrective measures, such as forming corrective coatings on the second mirror are utilized. For example, if the dispersion is such the phase difference $\phi_2$ is 10°, then the optical coating on the second mirror 102 is designed to shift the phase in the opposite direction by about 10° and thereby compensate for the phase difference.

FIGS. 2, 3, and 4 illustrate three examples of frequency-converted lasers that utilize an angled reflector to output a single converted beam.

FIG. 2 is a cross-sectional view of an embodiment of a frequency-converted laser having a laser cavity defined between a first mirror 201 and a second mirror 202, which together define a laser axis 205 for lasing operation. A solid-state gain medium 210, and the non-linear material 130 are situated within the optical cavity. An optical pump source 220 such as a laser diode array or single emitter diode supplies optical radiation in a longitudinal direction (i.e. along an axis parallel to the laser axis), and is focused by an optical element 225 into the gain medium 210. This pumping configuration is commonly termed "end-pumping". The pump source may comprise a single stripe laser diode, a diode array, or a laser diode bar. Multiple laser diodes can be used to provide additional pump energy, such as for high energy uses. One highly suitable optical pumping source is at least one gallium aluminum arsenide (GaAlAs) laser diode that emits laser radiation at a wavelength matched with a suitable absorption band of the gain medium. Preferably, the laser diode's polarization is oriented with respect to the crystal axes of the laser medium for maximum absorption. In one embodiment, optical radiation from a laser diode array is coupled into a plurality of optical fibers which are collected into a bundle that supplies optical radiation to the gain medium. One suitable embodiment of a such an assembly is disclosed in Ser. No. 08/791,248, now U.S. Pat. No. 5,771,324, entitled Polarization-Preserving Fiber Optic Assembly, which is hereby incorporated by reference herein.

In FIG. 2, the gain medium 210 comprises an etalon configuration that has two opposing parallel sides including a first side 211 and a second side 212. The gain medium is situated between a first OTH (Optically Transparent Heatsink) 215 that is connected to the first side 211 and a second OTH 216 that is connected to the second side 212. The OTHs operate by cooling the gain medium 210 and reducing thermal gradients, as described in U.S. Pat. No. 5,796,766 issued Aug. 18, 1998 entitled "Optically Transparent Heat Sink for Longitudinally Cooling an Element in a Laser", which is incorporated by reference herein, and also in U.S. Ser. No. 09/130,378, filed Aug. 6, 1998 entitled "Solid State Laser with Longitudinal Cooling", which is incorporated by reference herein. Generally, the OTHs comprise a material such as sapphire ($Al_2O_3$), diamond, and undoped (white) YAG that have an equal or higher thermal conductivity than the gain medium, advantageously providing effective heat transfer and permitting higher average power operation. The material selected for the OTHs should have a high optical transparency at the wavelength(s) where high transmission is desirable. Furthermore, in many embodiments the OTH material has a higher thermal conductivity than the laser element; for example, sapphire would be appropriate for $Nd:YVO_4$ because the thermal conductivity of $Nd:YVO_4$ is about 5.2 W/m-° C. and the thermal conductivity of sapphire is about 40 W/m-° C. However, in other embodiments the OTH may comprise an undoped gain medium, which has the same thermal conductivity as the gain medium. In some embodiments, it may be useful to approximately match the coefficients of thermal expansion of the OTHs and the gain medium, in order to maintain a good thermal contact between the two materials. Another design issue relates to manufacturing requirements: sapphire is very hard and therefore difficult to grind and polish, while white YAG is much easier. Therefore, sapphire is suitable for flat surfaces, while white YAG is suitable for non-flat surfaces.

In FIG. 2, the first OTH 215 comprises a flat-flat etalon structure, and the gain medium 210 also comprises a flat-flat etalon structure, thereby substantially reducing optical losses at intracavity interfaces adjacent to the gain medium. In one embodiment, the first OTH 215 comprises sapphire, which is preferred for flat-flat etalons, and the gain medium comprises $Nd:YVO_4$. The second OTH 216 has a flat surface coupled to the adjacent flat second side 212 of the gain medium, and an opposing side of the second OTH has an angled flat surface 250 that is angled with respect to the laser axis 205. The flat angled surface 250 is coated for high reflectivity at the converted wavelength, and also is coated for antireflection at the fundamental wavelength. In one embodiment, the second. OTH 216 comprises white (undoped) YAG, which is easier to shape and polish than sapphire.

Laser emission circulating within the cavity is represented by the forward-propagating emission 112 and the backward-propagating emission 114. At each pass through the non-linear material 130, the forward-propagating laser emission 112 generates a first frequency-converted beam 131 propagating in the forward direction, and the backward-propagating laser emission 114 generates a second frequency converted beam 132 propagating in the backward direction In the manner described above with reference to FIG. 1. The first beam 131 is reflected from the second mirror 202 to define a reflected beam 133 which combines with the backward propagating converted beam 132 to form the combined beam 140. The angled reflector on surfaces 250 reflects the combined beam at an exit angle 260 with respect to the laser axis, so that the reflected beam exits the laser cavity.

In alternative embodiments (not shown to FIG. 2), the angled reflector instead of on the second OTH could be formed directly on the gain medium. However, in that configuration, thermal lensing of the gain medium could cause a bulge in the center of the angled reflector which would distort and misdirect the reflected combined beam, and therefore such a configuration is not preferred. In still other alternative embodiments (not shown) to FIG. 2, the gain medium may not be highly absorptive of the converted wavelength, so that it may be acceptable to allow the converted beam to propagate through the gain medium. In one such alternative embodiment, the angled reflector could be situated on the other side of the gain medium, for example between the first reflector 101 and the gain medium 110, so that the backward-propagating converted beam propagates through the gain medium before being reflected at an angle. Such a configuration would also suffer from thermal distortion caused by thermal lensing, and therefore is not preferred.

FIG. 3 is a cross-sectional view of one embodiment of a frequency-converted laser having a laser cavity defined between a first mirror 301 and a second mirror 302, which together define a laser axis 305 for lasing operation. A solid state gain medium 310 and a non-linear optical material 330 are situated within the optical cavity. The optical pump source 220, such as a laser diode array or a laser diode array with a fiber optic bundle, supplies optical pump radiation that is focused by the optical element 225 into the gain medium within the laser cavity.

The non-linear crystal 330 in FIG. 3 includes a first surface 350 proximate to the gain medium that includes an angled reflector formed thereon. The first surface is coated for high reflection at the second wavelength corresponding to the converted radiation, and may also be anti-reflection coated at the fundamental wavelength. Opposite the first surface, a second surface 350 is formed on the non-linear crystal approximately normal (i.e., perpendicular to the laser axis 305. The second surface is coated for anti-reflection at both the fundamental and converted wavelengths.

In operation, at each pass through the non-linear material 330, the forward-propagating emission 112 generates a first frequency-converted beam 131 propagating in the forward direction, and backward-propagating emission 114 generates a second frequency converted beam 132 propagating in the backward direction in the manner described above with reference to FIG. 1. The first converted beam 131 exits from the second surface, and then reflects from the second mirror 302 to define a reflected converted beam 133 which then re-enters the non-linear crystal and combines with the backward propagating converted beam 132 to form the combined beam 140. The angled reflector reflects the combined beam at a predefined exit angle 360 with respect to the laser axis. The exit angle is selected so that the combined beam exits from the second surface 352 of the non-linear crystal. In this embodiment, after exiting from the second surface the combined beam propagates around the second mirror 102 which would otherwise reflect the beam.

FIG. 4 is a cross-sectional view of another embodiment of a frequency-converted laser having a laser cavity defined between a first mirror 401 and a second mirror 402, which together define a laser axis 305 for lasing operation. In FIG. 4, the optical pump source 220 is situated in close proximity to the gain medium 410 to supply optical pump radiation in a configuration known as butt-coupling.

The first mirror 401 is formed directly on an outer surface 408 of the solid state gain medium 410, (outer being defined with respect to the laser cavity). At the opposite end of the laser cavity, an outer surface 418 of the non-linear material 430 includes a first section 420 that is coated for high reflection at both the fundamental and the converted wavelengths. The outer surface 418 of the nonlinear material also includes a second section 422 that is antireflection coated at the converted wavelength in order to allow exit of the reflected combined beam through the outer end of the nonlinear material. In some embodiments the second section 422 may also be coated for reflection at the fundamental wavelength. Providing the section 422 on the outer end advantageously allows the reflected converted beam to exit directly through the end.

The nonlinear crystal 430 in FIG. 4 includes an inner surface 450 that includes an angled reflector formed thereon, proximate to the gain medium. The angled reflector is coated for high reflection at the second wavelength corresponding to the converted radiation, and is also anti-reflection coated at the fundamental wavelength. At each pass through the nonlinear material 430, the forward-propagating emission (not shown in FIG. 4) generates the first frequency-converted beam 131 propagating in the forward direction, and the backward-propagating emission generates a second frequency converted beam 132 propagating in the backward direction. The first beam 131 is reflected from the second mirror 402 to define a reflected beam 133 which combines with the backward propagating converted beam 132 to form the combined beam 140. The angled reflector reflects the combined beam at a predefined exit angle with respect to the laser axis, so that the reflected combined beam 140 exits through the second section 422 of the outer end 418 of the nonlinear material 430.

One advantage of forming the angled reflector on the first surface of the nonlinear crystal as shown in FIGS. 3 and 4 is that there are fewer optical surfaces that if the mirror is external as in FIG. 2, thereby improving efficiency. Furthermore, the angled reflector is pre-aligned in manufacturing when the angled reflector is formed on the first surface, thereby reducing alignment costs and substantially eliminating misalignment and related problems.

If the angled reflector is formed directly on the surface of the nonlinear material such as in FIGS. 3 or 4, or if the angled reflector is formed on the gain medium assembly as in FIG. 2, the optical axis will have a slight physical bend off the straight-line physical axis. This bend is caused by refraction of the fundamental beams at the angled surface. In order to compensate for this slight physical bend, one of the end mirrors may be tilted slightly with respect to a physical straight-line axis. The optical axis of the optical cavity is defined by the propagation of the fundamental laser emission, including any physical bend experienced during its propagation through the optical cavity. Selection of the proper angle for the end reflector can be determined by taking into account the angle of the reflector, the wavelength of the fundamental laser emission, and if appropriate, the index of refraction of the material comprising the angled reflector.

Alternative Embodiments

It will be appreciated by those skilled in the art, in view of these teachings, that alternative embodiments may be implemented without deviating from the spirit or scope of the invention. For example, while in some embodiments the first and second cavity reflectors 101 and 102 are flat and parallel and therefore define a flat-flat cavity, in other embodiments the cavity may have alternative configurations. For example, the first and/or second reflectors may be convex, or one could be concave and the other convex.

This invention is to be limited only by the following claims, which include all such embodiments and modifications when viewed in conjunction with the above specification and accompanying drawings.

What is claimed is:

1. A method of intracavity frequency conversion in an optical cavity that defines an optical axis between a first and a second reflector, comprising the steps of:

pumping a gain medium situated within the optical cavity to provide a fundamental laser emission propagating in a first direction along the optical axis and also propagating in a second, opposite direction along the optical axis;

frequency converting said emission propagating in said first direction within the optical cavity in a nonlinear material to generate a first converted beam propagating in the first direction;

reflecting said first converted beam from the second reflector; frequency converting said emission propagating in said second direction said nonlinear material to generate a second converted beam that co-propagates in the second direction together with said reflected first converted beam to provide a combined frequency-converted beam; and reflecting said combined frequency-converted beam at a predefined nonzero angle with respect to the optical axis to provide a reflected converted beam.

2. The method of claim 1 further comprising reflecting said combined beam so that said combined beam is substantially polarization independent.

3. The method of claim 1 wherein said step of reflecting said combined beam includes reflecting said combined beam at a non-Brewster's angle.

4. The method of claim 3, including reflecting said combined beam at an exit angle of less than about 30°.

5. The method of claim 4, including reflecting said combined beam at an exit angle within the range of about 0.5° to about 10°.

6. The method of claim 4, including reflecting said combined beam at an exit angle within the range of about 4° to about 7°.

7. The method of claim 4, including reflecting said combined beam at an exit angle of about 5°.

8. The method of claim 1 further comprising the step of reflecting said first converted beam from the second reflector so that said reflected first converted beam is approximately in phase with said emission propagating in said second direction within said nonlinear material.

9. The method of claim 1, wherein said nonlinear material has a first end proximate to the gain medium and a second end proximate to said angled reflector and wherein an angled reflector is formed on said first end to reflect said combined frequency-converted beam, and further comprising the step of outputting said reflected combined converted beam through the second end of said nonlinear material.

10. A frequency-converted laser in which a fundamental laser emission at a first wavelength is converted to second wavelength, comprising:

an optical cavity including a first reflector and a second reflector that define an optical axis, said first and second reflectors being reflective at said first wavelength, said second reflector also being reflective at said second wavelength;

a gain medium situated within said optical cavity;

a pump source for pumping said gain medium to excite a laser emission within the optical cavity;

a nonlinear material situated between said gain medium and said second reflector, said non linear material arranged within the optical cavity for converting said laser emission to said second wavelength; and an angled reflector that is reflective of said second wavelength and transmissive of said first wavelength, said angled reflector situated within the optical cavity between said first reflector and said nonlinear material for reflecting optical radiation at the converted wavelength, so that said reflected optical radiation exits said optical cavity at a nonzero exit angle with respect to the optical axis.

11. The laser of claim 10 wherein said angled reflector and said exit angle are selected so that said angled reflector reflects substantially all polarizations of said optical radiation at said converted wavelength.

12. The laser of claim 10 wherein said exit angle is a non-Brewster's angle.

13. The laser of claim 12 wherein said exit angle is less than about 30°.

14. The laser of claim 12 wherein said exit angle is within a range of about 0.5° to about 10°.

15. The laser of claim 12 wherein said exit angle is within a range of about 4° to about 7°.

16. The laser of claim 12 wherein said exit angle is about 5°.

17. The laser of claim 10, wherein said nonlinear material comprises a first end proximate to the gain medium and a second end proximate to said second reflector, and wherein said angled reflector is formed on said first end.

18. The laser of claim 17, wherein said second end of said nonlinear material includes
a first section that intersects the laser axis, said first section being substantially reflective at the second wavelength; and
a second section substantially transmissive at said second wavelength, said second section arranged with respect to the angled reflector so that said reflected optical radiation is output through said second section.

19. The laser of claim 10, wherein said gain medium is coupled to a surface that comprises said angled reflector.

20. The laser of claim 19 further comprising an optically transparent heatsink coupled to said gain medium, said heatsink including said surface that comprises said angled reflector.

21. The laser of claim 10 wherein said emission propagates in a first direction along the optical axis and also propagates in a second, opposite direction along the optical axis, said emission propagating in said first direction generating a first converted beam that is reflected from said second reflector, and said emission propagating in said second direction generating a second converted beam that combined with said reflected first converted beam to provide a combined beam, and further comprising means for reflecting said first converted beam from the second reflector so that said reflected first converted beam is approximately in phase with said second converted beam within said nonlinear material.

22. A frequency-converted laser in which a fundamental laser emission at a first wavelength is converted to second wavelength, comprising:

means for providing an optical cavity that includes a first and a second end mirror defining an optical axis;

a gain medium situated within said optical cavity;

pump means for pumping said gain medium to provide said laser emission along the optical axis;

frequency-conversion means for frequency converting the laser emission within the optical cavity means to generate a first converted beam propagating in a first direction along the optical axis and a second converted beam propagating in a second, opposite direction along the optical axis;

said second end mirror including means for reflecting said first converted beam along said optical axis so that said reflected beam co-propagates together with said second converted beam to provide a combined beam; and reflector means situated within said optical cavity for reflecting said combined converted beam at a predefined nonzero angle.

23. The laser of claim 22 wherein said angled reflector and said exit angle are selected so that said angled reflector reflects substantially all polarizations of said combined beam.

24. The laser of claim 22 wherein said exit angle is a non-Brewster's angle.

25. The laser of claim 24 wherein said exit angle is less than about 30°.

26. The laser of claim 24 wherein said exit angle is within a range of about 0.5° to about 10°.

27. The laser of claim 24 wherein said exit angle is within a range of about 4° to about 7°.

28. The laser of claim 24 wherein said exit angle is about 5°.

29. The laser of claim 22, wherein said nonlinear material comprises a first end proximate to the gain medium and a second end proximate to said second reflector, and wherein said angled reflector is formed on said first end.

30. The laser of claim 29 wherein said second end includes
 a first section that intersects the laser axis, said first section being substantially reflective at the second wavelength; and
 a second section arranged with respect to the angled reflector so that said reflected combined converted beam is output therethrough, said second section being substantially transmissive at said second wavelength.

31. The laser of claim 22, wherein said gain medium is coupled to a surface that comprises said angled reflector.

32. The laser of claim 31 further comprising an optically transparent heatsink coupled to said gain medium, said heatsink including said surface that comprises said angled reflector.

33. The laser of claim 22 further comprising means for reflecting said first converted beam from the second reflector so that said first and second converted beams are approximately in phase within said nonlinear material.

34. A frequency-converted laser in which a fundamental laser emission at a first wavelength is converted to second wavelength, comprising:
 a linear optical cavity including a first reflector and a second reflector that define an optical axis, said first and second reflectors being reflective at said first wavelength, said second reflector also being reflective at said second wavelength;
 a gain medium situated within said optical cavity;
 a pump source for pumping said gain medium to excite the laser emission within the optical cavity;
 a nonlinear material situated between said gain medium and said second reflector, said non linear material arranged within the optical cavity for converting said laser emission to said second wavelength; and
 an angled reflector that is reflective of said second wavelength and transmissive of said first wavelength, said angled reflector situated within the optical cavity between said gain medium and said nonlinear material for reflecting optical radiation at the converted wavelength at a nonzero exit angle with respect to the optical axis, said angled reflector and said exit angle being selected so that said angled reflector reflects substantially all polarizations of said combined beam.

35. The laser of claim 34 wherein said exit angle is less than about 30°.

36. The laser of claim 35 wherein said exit angle is within a range of about 0.5° to about 10°.

37. The laser of claim 35 wherein said exit angle is within range of about 4° to about 7°.

38. The laser of claim 35 wherein said exit angle is about 5°.

39. The laser of claim 34, wherein said nonlinear material comprises a first end proximate to the gain medium and a second end proximate to said second reflector, and wherein said angled reflector is formed on said first end.

40. The laser of claim 39 wherein said second end includes
 a first section that intersects the laser axis, said first section being substantially reflective at the second wavelength; and
 a second section arranged with respect to the angled reflector so that said reflected combined converted beam is output therethrough, said second section being substantially transmissive at said second wavelength.

41. The laser of claim 34 further comprising an optically transparent heatsink coupled to said gain medium, said heatsink including said surface that comprises said angled reflector.

42. The laser of claim 34 wherein said emission propagates in a first direction along the optical axis and also propagates in a second, opposite direction along the optical axis, said emission propagating in said first direction generating a first converted beam that is reflected from said second reflector, and said emission propagating in said second direction generating a second converted beam that combined with said reflected first converted beam to provide a combined beam, and further comprising means for reflecting said first converted beam from the second reflector so that said reflected first converted beam is approximately in phase with said second converted beam within said nonlinear material.

* * * * *